US006554291B2

(12) United States Patent
Turos

(10) Patent No.: US 6,554,291 B2
(45) Date of Patent: *Apr. 29, 2003

(54) HOUSING AND HUB FOR AN APPARATUS FOR SECURING A WORKPIECE TO A ROTATABLE MACHINE MEMBER

(75) Inventor: Kenneth Turos, Albuquerque, NM (US)

(73) Assignee: Sun Standard, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,503

(22) Filed: Jun. 12, 2001

(65) Prior Publication Data

US 2001/0026052 A1 Oct. 4, 2001

Related U.S. Application Data

(63) Continuation-in-part of application No. 09/394,381, filed on Sep. 9, 1999.

(51) Int. Cl.[7] .............................................. B23B 5/02
(52) U.S. Cl. ......................... 279/133; 82/112; 82/163; 279/141; 408/143; 409/141; 451/398
(58) Field of Search ........................... 279/133; 82/112, 82/165, 903, 163; 408/143; 74/574; 464/180; 451/385, 398; 301/6, 91; 409/141; 188/218 A

(56) References Cited

U.S. PATENT DOCUMENTS

| | | | | |
|---|---|---|---|---|
| 2,012,838 A | * | 8/1935 | Tilden .................... 188/218 A |
| 3,662,855 A | * | 5/1972 | Adams et al. ............... 173/139 |
| 4,126,066 A | * | 11/1978 | Wagor et al. .................. 74/574 |
| 4,556,130 A | * | 12/1985 | Puszakowski ........... 188/218 A |
| 4,656,899 A | * | 4/1987 | Contoyonis ............. 188/218 A |
| 4,708,041 A | * | 11/1987 | Granger ...................... 279/133 |
| 5,095,786 A | * | 3/1992 | Bellinghausen et al. ...... 82/112 |
| 5,224,303 A | * | 7/1993 | Baldwin ...................... 51/168 |
| 5,737,985 A | * | 4/1998 | Rimlinger, Jr. ............... 82/112 |
| 5,996,454 A | * | 12/1999 | Brinks, Jr. ..................... 82/112 |
| 6,279,919 B1 | * | 8/2001 | Turos ......................... 279/133 |

* cited by examiner

Primary Examiner—Steven C. Bishop
(74) Attorney, Agent, or Firm—Ray R. Regan

(57) ABSTRACT

A housing and hub for an apparatus for securing a workpiece to a rotatable machine member are provided. The machine may include a lathe. The workpiece includes a rotor such a brake rotor. The apparatus includes a hub slidably engageable with a rotatable driven shaft of the lathe. The hub is formed with a first banded channel. Also included is a centering device axially positionable on the shaft. A spring having a distal end demountably insertable in the hub, and a proximal end connectable to the centering device, is included. The apparatus also includes a retaining ring attachable to the hub for retaining the centering device in the hub. A housing is provided that is freely movable axially on the shaft for securing the rotor substantially vertically on the shaft. The housing is formed with a second banded channel. A locking nut is included to secure the components of the apparatus on a machine member.

25 Claims, 6 Drawing Sheets

HOUSING AND HUB FOR AN APPARATUS FOR SECURING A WORKPIECE TO A ROTATABLE MACHINE MEMBER

CROSS-REFERENCE TO RELATED APPLICATION

As provided in 35 U.S.C. §119, applicant claims priority to this continuation-in-part application based on the copending nonprovisional United States patent application filed in the United States Patent and Trademark Office by Kenneth Turos on Sep. 9, 1999, the same sole inventor named in this application, application Ser. No. 09/394,381, for which a notice of allowance has issued, and the issue fee has been paid.

FIELD OF THE INVENTION

The present invention pertains generally to securing a workpiece to a machine member to perform work on the workpiece. More particularly, the present invention pertains to a brake lathe adapter system for securing a brake rotor to a rotatable shaft of a lathe. The present invention is particularly, but not exclusively, useful for contributing to reduction of harmonics and vibrations on a workpiece, improving safety in handling components of the apparatus, and for reducing or eliminating forces that may act on a brake rotor, rotating shaft, and other components of a lathe during operation of a lathe for machining, refinishing, balancing, or resurfacing a brake rotor.

BACKGROUND OF THE INVENTION

During refinishing or resurfacing of a rotating workpiece mounted on a rotatable shaft, a workpiece and the shaft may be subjected to a variety of forces and phenomena. In general, forces due to rotation and gravity tend to preclude uniform rotation of a rotating shaft and a rotating workpiece in a single, unvarying plane of rotation. If the workpiece is a rotor or drum, such as a brake rotor or brake drum that is mounted on a rotating shaft of a machine such as a lathe, forces acting on the shaft and workpiece during rotation of the shaft and workpiece may distort one or more planes and axes of rotation in connection with the rotor, and to exert a variety of angular and planar forces that may affect how accurately and quickly an operator of the lathe may work on the rotor. Forces and force vectors may cause harmonics and vibrations that may be transmitted to the shaft, rotor and other components of the lathe during rotation. Any nonuniform rotation of a rotor during a refinishing or resurfacing operation may cause a cutting tool brought in contact with a rotor to produce an inferior surface on a working area or surface of a rotor.

As indicated, during operation of a rotatable shaft on a machine for refinishing or resurfacing a rotor, forces including gravity, friction, velocity of rotation, and a variety of load forces may be applied during operation to bearings, driven shafts, turning spindles, retaining devices, locking nuts, and other components of driving machines and driven shafts (collectively, "machine members"). Similar forces may be induced in a workpiece such as a rotor. For example, circular rotation of shafts may give rise to centripetal force, a force that may be reacted to by centrifugal reaction. Angular velocity and angular acceleration of rotating workpieces subjected not only to varying velocities during operation, but also to differing loads or pressures, also may cause gyroscopic effects on rotating workpieces, such as a rotor, attached to a rotating machine member, such as a shaft, that may turn or rotate over a range of different speeds. Machine members, and workpieces attached to machine members, also maybe subjected to significant loads about the geometric and rotational axes of a rotating workpiece. When two forces act on a rotatable shaft, spindle, pin, axle or similar rod or assembly (collectively, "shaft"), a torque may be formed whose vector along an x-axis may produce a rotation about the y-axis known as precession. Such rotation may generate significant angular velocities. All of the foregoing forces, phenomena, torque and related effects (collectively, "forces") may individually and collectively contribute to causing nonuniform rotation of a workpiece that has been attached to a rotating shaft on a machine such as brake lathe for working on a brake rotor.

In addition to such forces, angular accelerations and velocities may be present in connection with a rotating machine member, leading to unbalanced forces that induce high harmonics, chattering, and vibrations. In some but not all instances, if the speed of rotation of a shaft is slowly increased from rest, a speed may be achieved at which a deflection increases suddenly, a phenomenon known as "whirling." A shaft that is balanced will rotate around the center of gravity or axis of rotation of a shaft. If a shaft rotates at an angular velocity, however, the shaft may deflect a distance from the center of gravity or axis of rotation due to centripetal reaction. Rotation also may induce undamped free vibrations.

A machine used to refinish or resurface a brake rotor generally includes a driving motor, a driven or turning shaft, one or more retaining devices attached to the shaft for removably mounting a workpiece such as a brake rotor on the one or more retaining devices, and one or more cutting tools that may reciprocally engage a surface of a brake rotor to be machined, refinished or resurfaced. All of the foregoing forces and phenomena, and others, may contribute to nonuniform rotation of the shaft, and consequent nonuniform rotation of a rotor attached to a rotatable shaft. This is particularly true, but not exclusively, in machine members on which brake rotors are mounted for turning purposes, such as refinishing or resurfacing the brake rotor. A cutting tool brought into contact with a rotating rotor may also induce a variety of such forces and phenomena.

A variety of apparatus have been proposed to reduce or eliminate such forces and phenomena, seeking to enable a machine operator, including a brake lathe operator, to more effectively machine, refinish or resurface a rotating workpiece such as a brake rotor. An exemplary device, for example, is disclosed in the copending nonprovisional United States patent application filed in the United States Patent and Trademark Office by Kenneth Turos on Sep. 9, 1999, the same sole inventor named in this application, application Ser. No. 09/394,381. Other apparatus, however, seeking to solve such problems include components that are complex, difficult to assemble, difficult to operate, and comparatively expensive.

The problem solved by copending nonprovisional United States patent application filed in the United States Patent and Trademark Office by Kenneth Turos on Sep. 9, 1999, the same sole inventor named in this application, application Ser. No. 09/394,381, was providing an apparatus for securing a rotatable workpiece on a rotatable machine member, including a brake rotor on a brake rotor lathe, that reduces or substantially eliminates the effect of forces acting and reacting on the rotating workpiece and rotating shaft of the lathe, thus enabling an operator to produce a more accurately and precisely machined, turned and resurfaced brake rotor. It would further enhance the invention disclosed in application Ser. No. 09/394,381 to provide a housing and hub for an apparatus for securing a workpiece to a rotatable machine member that contributes to reduction of harmonics and vibrations on a workpiece, improves safety in handling components of the apparatus, and further contributes to reducing or eliminating forces that may act on a brake rotor, rotating shaft, and other components of a lathe during operation of a lathe for machining, refinishing, balancing, or resurfacing a brake rotor.

One of the advantages of the novel housing and hub for an apparatus for securing a rotor to a rotatable shaft, according to the present invention, is an apparatus allows an operator of a lathe to produce a more accurately and precisely machined, turned and resurfaced brake rotor. Another advantage of the present invention is the ability of the apparatus to reduce or eliminate forces that otherwise tend to act and react on a rotating shaft and a rotating rotor during operation of a machine such as a lathe. The present invention also has the significant advantages of being simple to install and reposition, yet enhances safety in gripping and handling the housing and hub components. In addition, the present invention further reduces harmonics and vibrations on a workpiece.

Yet another advantage of the present invention is to provide a new and improved apparatus for securing a workpiece to a rotating machine member that may be easily and efficiently manufactured, yet is durable and of reliable construction. An even further advantage of the present invention is providing low cost of manufacture with regard to both materials and labor. The present invention is respectively easy to use and to practice, and cost effective for its intended purposes.

These advantages and other objects and features of such an apparatus for will become apparent to those skilled in the art when read in conjunction with the accompanying following description, drawing figures, and appended claims.

SUMMARY OF THE INVENTION

A housing and hub for an apparatus for securing a workpiece to a machine member, according to the present invention, includes a drum. The drum is slidably engageable on the machine member. The machine member may be a rotatable driven shaft of the machine, conventionally cylindrical in shape, but may be of any shape. The drum is formed with a chamber. In addition, a hole is formed in the drum through which the rotatable driven shaft may be inserted for installing the drum on the shaft. The hole is substantially coincident with the longitudinal axis of the drum. A groove is formed in the chamber of the drum. A ring is insertable into the groove. The drum also is formed with an external surface. A channel girding the drum is formed in the external surface of the drum. An elastomeric material is insertable into the channel.

A body that also is positionable on the machine member, such as a rotatable driven shaft, is provided. The body is formed substantially in the shape of a truncated cone. The body includes a passage formed in the body. The passage is substantially coincident with a longitudinal axis through the body. In operation, the passage forms substantially a slip fit with the machine member. As previously indicated, the present invention includes a ring. When inserted into the groove formed in the chamber of the drum, the ring assists in retaining the body in the chamber of the drum during operation of the apparatus.

A housing and hub for an apparatus for securing a workpiece on a machine member also includes means for centering a workpiece on the shaft substantially along the longitudinal axis of the shaft during operation of the machine and apparatus. The means may be a spring, one end of which may be inserted into the drum, the other end of which may be connected to the body.

Also included is a housing. The housing is formed with a cavity. The cavity is shaped to receive a portion of the body, and may be shaped substantially identical to the body. The housing has a duct through the housing. The duct is shaped to allow the housing to be slidably moveable on the machine member. The housing is also formed with an external face. A channel girding the housing is formed in the external face of the housing. An elastomeric material is insertable into the channel.

In an application of the present invention to a brake lathe for machining, refinishing, balancing, or resurfacing a brake rotor, the present invention provides an adapter system for securing a rotor to a lathe. An adapter system for securing a rotor to a lathe includes a hub. The hub is slidably engageable with a rotatable driven shaft of the lathe. The hub is formed with a chamber. The chamber has an interior face, exterior face, a rim, an inner surface, and a hole. The hole is dimensioned to be substantially coincident with the longitudinal axis of the hub between the interior face and the exterior face of the hub. The hole also is dimensionally shaped to slide on and engage the rotatable shaft of the lathe. The hub is formed with a substantially circumferential groove in the inner surface of the chamber. The groove is shaped to hold a ring that also is provided in the present invention. The ring is formed with a first end, a second end, and a gap between the first end and the second end. When inserted into the groove formed in the chamber of the hub, the ring assists in retaining the centering device, described below, within the chamber during operation of the machine and apparatus. The hub also is formed with an external surface. A channel girding the hub is formed in the external surface of the hub. An elastomeric material is insertable into the channel.

An adapter system for securing a rotor to a lathe, according to the present invention, also includes a centering device. The centering device is positionable on the rotatable shaft. The centering device is shaped substantially like a truncated cone. The centering device is formed with a top plane, a bottom plane, a cone surface, and a collar. The collar tapers from the base of the truncated cone to the bottom plane, and is substantially coincident with the longitudinal axis through the center of the top plane and the bottom plane. The bottom plane is also formed with a slot. The slot is substantially circumferential.

Also included in the present invention is a spring. The spring has a distal end and a proximal end. The distal end of the spring may be inserted into the hub. The proximal end of the spring may be connected to the centering device. The spring may be connected to the centering device by inserting the proximal end of the spring in the slot formed in the bottom plane of the centering device. The spring contributes to centering a workpiece such as a rotor on the shaft of the lathe.

The present invention also includes a housing. The housing is formed with a cavity. The cavity is shaped for receiving the centering device. The cavity has an inner anterior face, an inner side, an exterior wall, and an outer posterior plate. The inner side of the cavity is formed in the shape of a cone substantially identical dimensionally to the cone surface of the centering device. A duct is formed in the cavity of the housing. The duct is substantially coincident with the longitudinal axis of the rotatable driven shaft between the inner anterior face and the outer posterior plate. The housing is also formed with an external face. A channel girding the housing is formed in the external face of the housing. An elastomeric material is insertable into the channel.

When installed on a shaft of a lathe, the hub, centering device, spring, retaining ring, and housing are held in position during operation of the lathe and apparatus by a locking nut.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Figure 1:
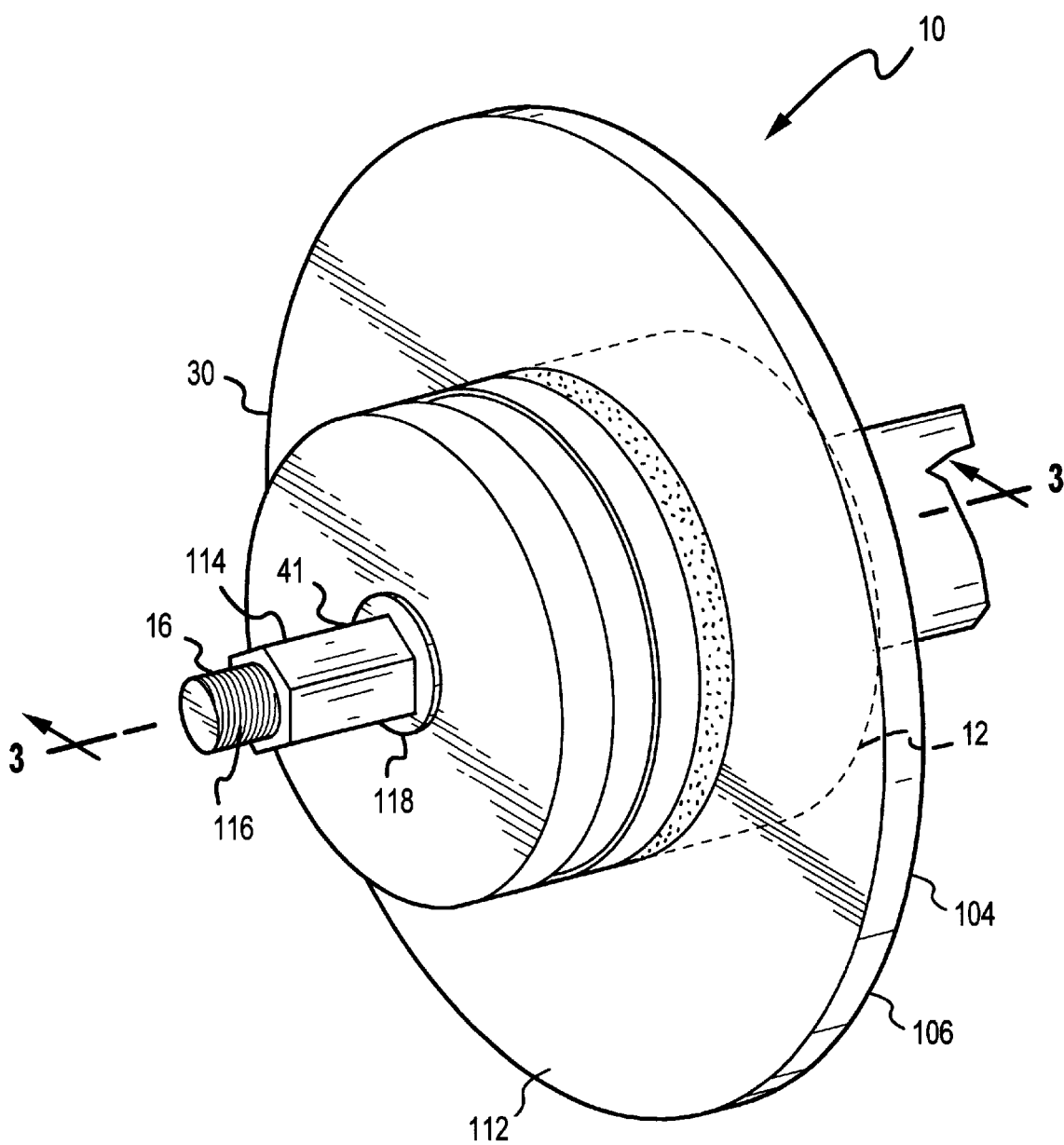
FIG. 1 is a perspective view of the apparatus for securing a workpiece to a rotatable machine member in an operative environment.
Figure 2:
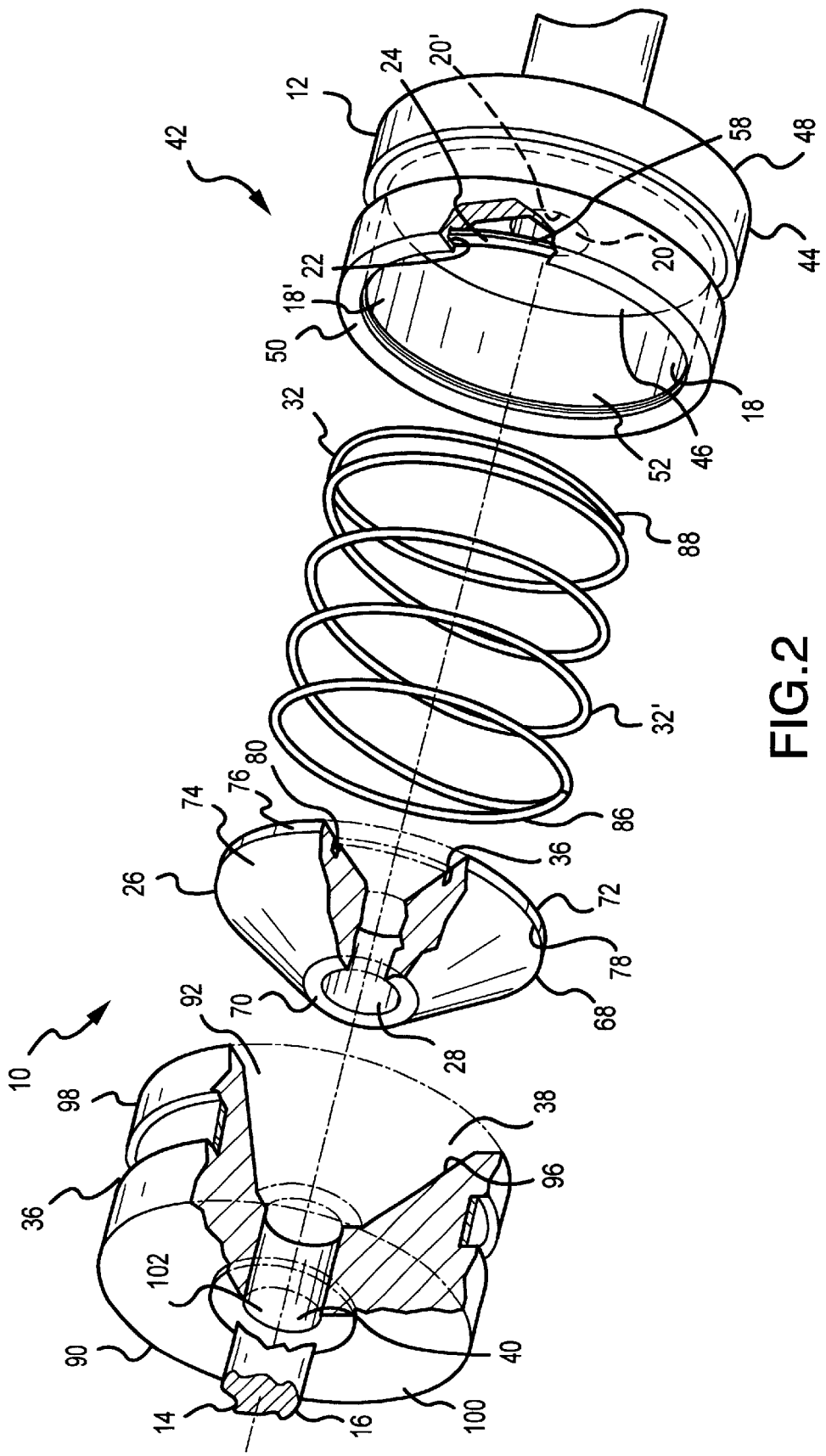
FIG. 2 is an exploded perspective view of the elements of the apparatus for securing a workpiece to a rotatable machine member with selected components shown partially broken away.
Figure 3:
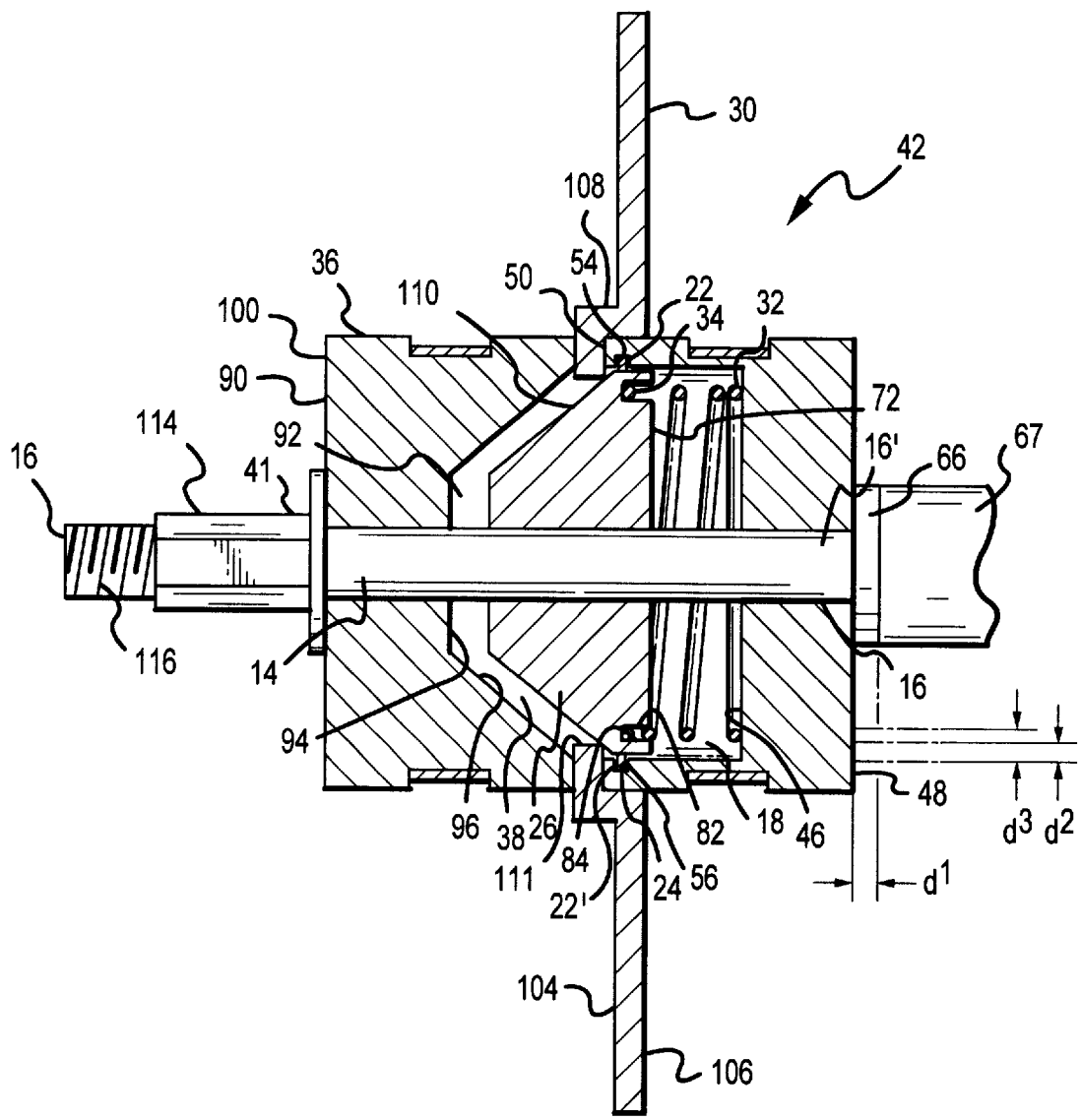
FIG. 3 is a cross-sectional view of the apparatus for securing a workpiece to a rotatable machine member along the line 3—3.
Figure 5A:
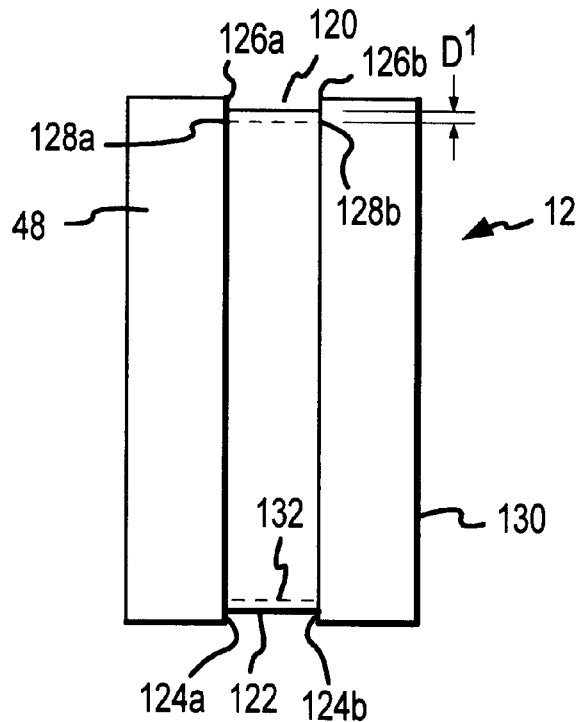
FIGS. 5A and 5B are side and perspective views of the banded channels in the hub.
Figure 5B:
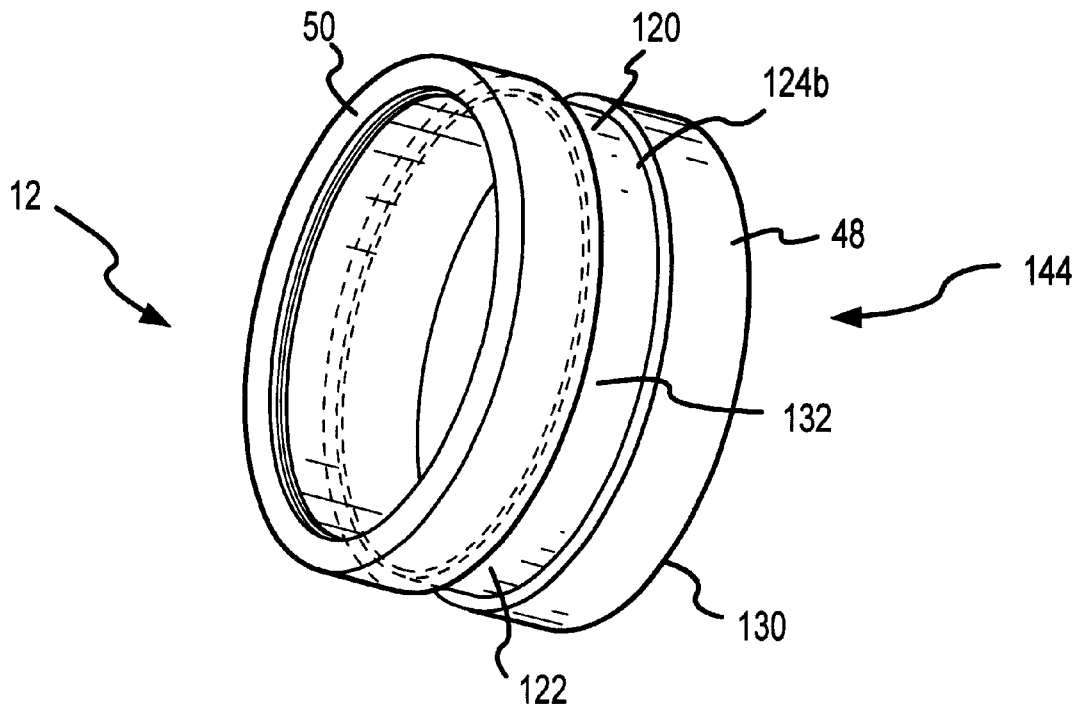

Referring initially to FIG. 1, the apparatus for securing a workpiece to a rotatable machine member is shown and generally designated 10. As shown by cross-reference among FIGS. 1–3, but as perhaps best shown in FIG. 2, a housing and hub for an apparatus for securing a workpiece to a rotatable machine member 10 includes a drum 12. Drum 12 is slidably engageable on a machine member 14. Machine member 14 may be a rotatable driven shaft 16 of a machine (not shown). Rotatable driven shaft 16 is conventionally cylindrical in shape, but may be of any shape. As best shown by cross-reference between FIGS. 2 and 3, drum 12 is formed with a chamber 18. In addition, as best shown in FIG. 3, a hole 20 is formed in drum 12. Hole 20 is substantially coincident with the longitudinal axis of drum 12. Drum 12 also includes a groove 22. Groove 22 is formed in chamber 18 of drum 12. The present invention also includes a ring 24. Ring 24 is insertable into groove 22 in drum 12, as best shown in FIG. 2. As subsequently described, drum 12 is formed with an exterior face 48, as shown by cross-reference between FIGS. 2 and 5. As perhaps best shown in FIGS. 5A and 5B, a first channel 120 is formed through exterior face 48 into drum 12. In a preferred embodiment of the present invention, first channel 120 is formed with a first trough 122, and opposing walls 124a,b extending substantially perpendicular from first trough 122, and having a top edge 126a,b and a bottom edge 128a,b, as shown best in FIG. 5A. In a preferred embodiment of the present invention, first trough 122 is located substantially coincident along a center line of drum 12 substantially midway between rim 50 and base 130 of drum 12. First channel 120 thus forms a channel girding drum 12 substantially around the center of drum 12. In accordance with the present invention, an elastomeric material 132 is inserted into first channel 120, as shown in FIGS. 5A and 5B. In a preferred embodiment of the present invention, elastomeric material 132 is rubber. The depth to which elastomeric material 132 is inserted into first channel 120 is not a material limitation of the present invention. In a preferred embodiment, however, it has been found that the depth of elastomeric material 132, as shown diagrammatically by $D^1$ in FIG. 5A, is approximately ¾ of the distance between top edge 126a,b and bottom edge 128a,b of first channel 120. In this document the resulting first channel 120 in which elastomeric material 132 is inserted is referred to as the "first banded channel." In operation, the insertion of elastomeric material 132 into first channel 120 contributes to reduction of harmonics and vibrations on a workpiece, improves safety in handling the drum and housing of the apparatus, and reduces forces that may act on a brake rotor, rotating shaft, and other components of a lathe during operation of a lathe for machining, refinishing, balancing, or resurfacing a brake rotor.

As shown by cross-reference between FIGS. 2 and 3, a housing and hub for an apparatus for securing a workpiece to a machine member 10 also includes a body 26. Body 26 is positionable on machine member 14. Body 26 is formed substantially in the shape of a truncated cone, as shown best in FIG. 2. Body 26 includes a passage 28 formed in body 26. Passage 28 is substantially coincident with the longitudinal axis through body 26. In operation, passage 28 forms substantially a slip fit with machine member 14. As indicated, the present invention includes ring 24. Ring 24 is placed in groove 22 of chamber 18 of drum 12 to assist in retaining body 26 in chamber 18 of body 26 during operation of the apparatus and machine.

A housing and hub for an apparatus for securing a workpiece on a machine member 10 also includes means for selectively positioning workpiece 30 on machine member 14 during operation, as best shown in FIG. 3. As shown by cross-reference between FIGS. 2 and 3, the means for selectively positioning workpiece 30 may be a body 26. Also included is spring 32. One end of spring 32 is insertable into chamber 18 of drum 12. The other end of spring 32 is insertable into a slot 34 formed in body 26.

Figure 6A:
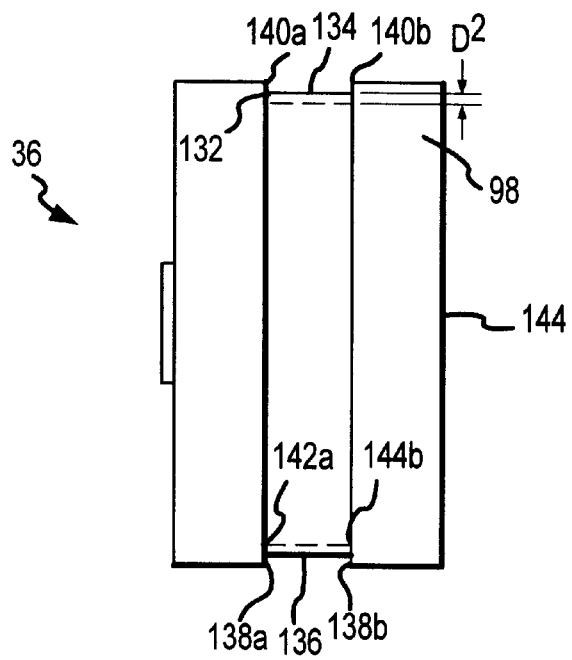
FIGS. 6A and 6B are side and perspective views of the banded channels in the housing.
Figure 6B:
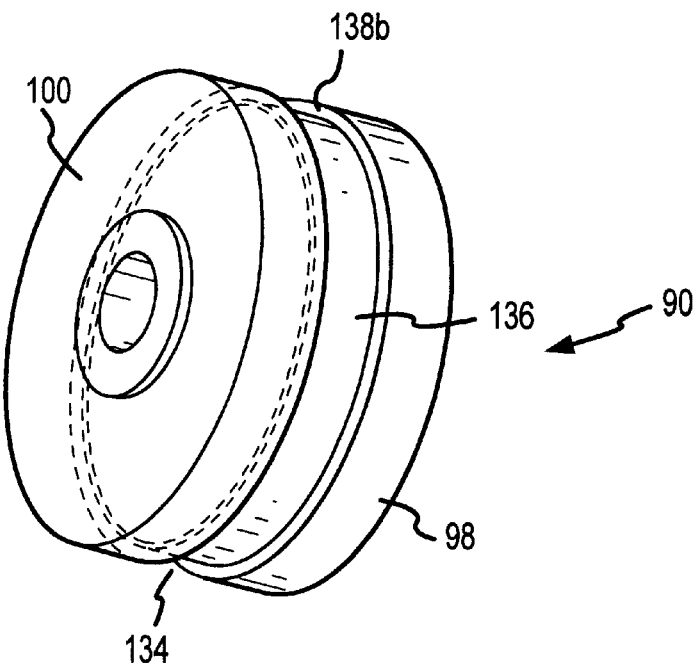

Also included in the present invention is a housing 36. Housing 36 is formed with a cavity 38. Cavity 38 is shaped to receive body 26, and may be shaped substantially identical to body 26. Housing 36 is formed with a duct 40 through housing 36 as best shown in FIG. 2. Duct 40 is shaped to allow housing 36 to be slidably moveable on machine member 14. Housing 36 is freely connectable to machine member 14 for assisting in locating workpiece 30 substantially perpendicular to machine member 14. Means 41 for demountably locking drum 12, body 26, ring 22, and housing 36 on machine member 14 also is included. As subsequently described, housing 36 also is formed with an exterior wall 98, as shown by cross-reference between FIGS. 2 and 6. As perhaps best shown in FIGS. 6A and 6B, a second channel 134 is formed through exterior wall 98 into housing 36. In a preferred embodiment of the present invention, second channel 134 is formed with a second trough 136, and opposing walls 138a,b extending substantially perpendicular from second channel 134, and having an upper edge 140a,b and a lower edge 142a,b, as shown best in FIG. 6A. In a preferred embodiment of the present invention, second trough 136 is located substantially coincident along a center line of housing 36 substantially midway between rim outer posterior plate 100 and trailing plate 144 of housing 36. Second channel 134 thus forms a channel girding housing 36 substantially around the center of housing 36. In accordance with the present invention, an elastomeric material 132 is inserted into second channel 134, as shown in FIGS. 6A and 6B. In a preferred embodiment of the present invention, elastomeric material 132 is rubber. The depth to which elastomeric material 132 is inserted into second channel 134 is not a material limitation of the present invention. In a preferred embodiment, however, it has been found that the depth of elastomeric material 132, as shown diagrammatically by $D^2$ in FIG. 6A, is approximately ¾ of the distance between upper edge 140a,b and a lower edge 142a,b of second channel 134. In this document the resulting second channel 120 in which elastomeric material 132 is inserted is referred to as the "second banded channel." In operation, the insertion of elastomeric material 132 into second channel 134 contributes to reduction of harmonics and vibrations on a workpiece, improves safety in handling the drum and housing of the apparatus, and reduces forces that may act on a brake rotor, rotating shaft, and other components of a lathe during operation of a lathe for machining, refinishing, balancing, or resurfacing a brake rotor.

Figure 4:
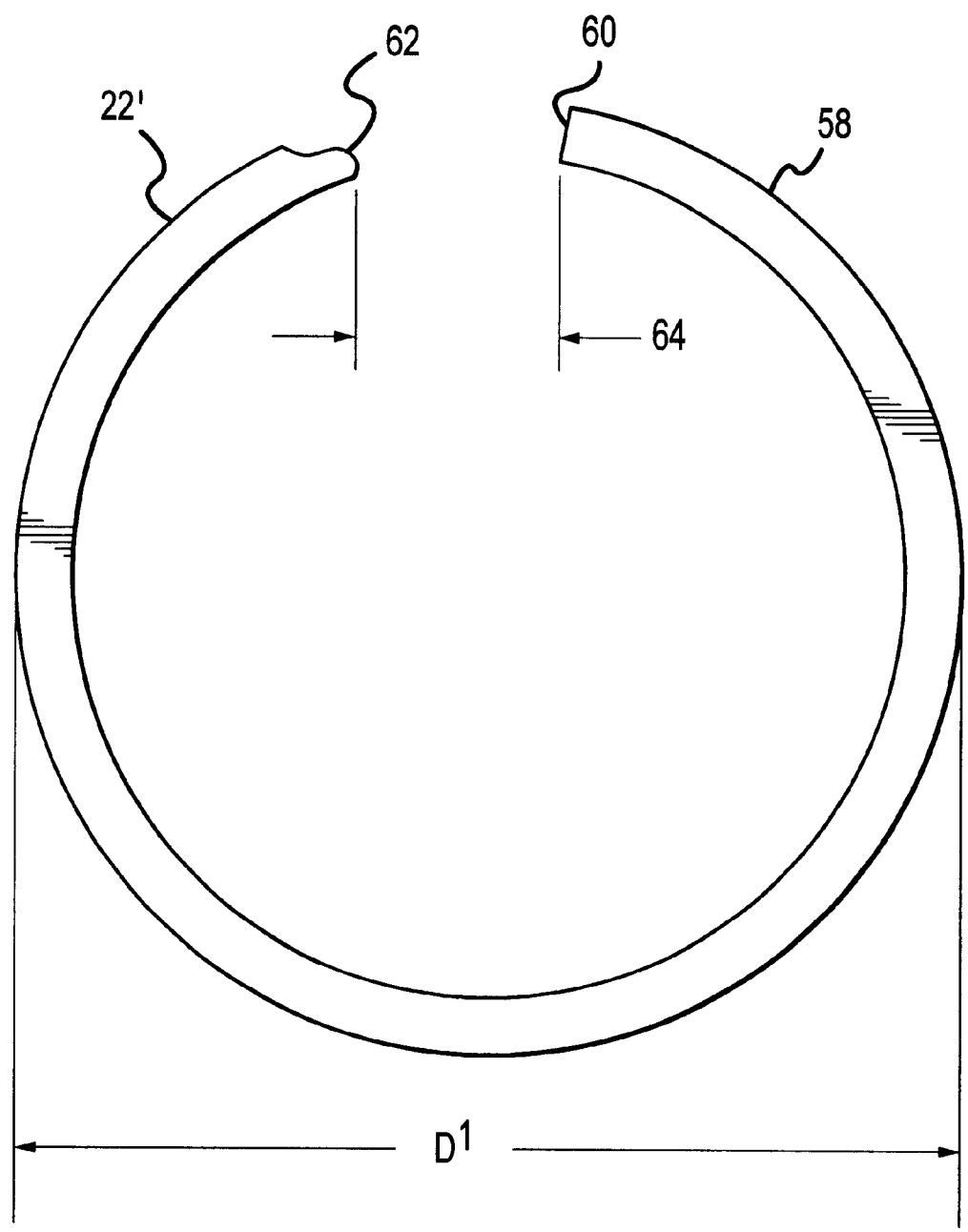
FIG. 4 is a top plan view of the retaining ring included in the present invention.

In an application of the present invention to a brake lathe for machining, refinishing, balancing, or resurfacing a brake rotor, the present invention provides a housing and a hub for an adapter system for securing a rotor to a lathe 42 as best shown by cross-reference among FIGS. 2, 3, 5A and 5B, and 6A and 6B. An adapter system for securing a rotor to a lathe 42 includes a hub 44. Hub 44 is slidably engageable with rotatable driven shaft 16' of a lathe (not shown). Rotatable driven shaft 16' of a lathe is conventionally also referred to either as a spindle or arbor. Hub 44 is formed with a chamber 18'. Chamber 18' has an interior face 46, an exterior face 48, a rim 50, and an inner surface 52, as best shown in FIG. 2. The present invention also includes a hole 20'. Hole 20' is dimensioned to be substantially coincident with the longitudinal axis of hub 44 between interior face 46 and exterior face 48 of hub 44. Hole 20' also is dimensionally shaped to slide on and engage rotatable shaft 16'. Also included in hub 44 is a groove 22', as best shown in FIG. 2. In a preferred embodiment of the present invention, groove 22' is substantially circumferential, and is formed in interior face 46 of chamber 18'. In a preferred embodiment of the present invention, groove 22' extends approximately 0.14 inches, plus or minus 0.010 inches, into inner surface 52 of hub 44. Groove 22' has a first groove surface 54 and a second groove surface 56. In a preferred embodiment of the present invention, first groove surface 54 is approximately 0.050 inch, plus or minus 0.010 inch, from rim 50 of hub 44. In a preferred embodiment of the present invention, hub 44 is manufactured of metal. Preferably, the metal is hot roll steel number 1141 consistent with mill specifications. As best shown in FIG. 3, groove 22' is dimensionally shaped to hold retaining ring 58 that also is included in the present invention. As best shown in FIG. 2, retaining ring 58 may be formed with a first end 60, a second end 62, and a gap 64 formed between first end 60 and second end 62 of retaining ring 58. Retaining ring 58, in the preferred embodiment of the present invention, is made of metal. In a preferred embodiment of the present invention, retaining ring 58 is a light duty series steel ring manufactured by Smalley Steel Ring Company, identification number VH-425, having a free outside diameter $D^1$ of 4.405 inches as shown in FIG. 4. As shown in FIG. 3, a first raised extension 66 is included on exterior face 48 of hub 44 to assist in positioning the adapter system for securing a rotor to a lathe 42 on shaft 16' adjacent arbor collar 67. First raised extension 66 may be of any shape or dimension, but in a preferred embodiment of the present invention first raised extension 66 extends a distance $d^1$ from exterior face 48 of hub 44 as shown in FIG. 2, and preferably is approximately 0.065 inch, plus or minus 0.010 inch.

As shown by cross-reference between FIGS. 2 and 5, and perhaps best shown in FIGS. 5A and 5B, a first channel 120 is formed through exterior face 48 into hub 44. In a preferred embodiment of the present invention, first channel 120 is formed with a first trough 122, and opposing walls 124a,b extending substantially perpendicular from first trough 122, and having a top edge 126a,b and a bottom edge 128a,b, as shown best in FIG. 5A. In a preferred embodiment of the present invention, first trough 122 is located substantially coincident along a center line of hub 44 substantially midway between rim 50 and base 130 of hub 44. First channel 120 thus forms a channel girding hub 44 substantially around the center of hub 44. In accordance with the present invention, an elastomeric material 132 is inserted into first channel 120, as shown in FIGS. 5A and 5B. In a preferred embodiment of the present invention, elastomeric material 132 is rubber. The depth to which elastomeric material 132 is inserted into first channel 120 is not a material limitation of the present invention. In a preferred embodiment, however, it has been found that the depth of elastomeric material 132, as shown diagrammatically by $D^1$ in FIG. 5A, is approximately ¾ of the distance between top edge 126a,b and bottom edge 128a,b of first channel 120. In operation, the insertion of elastomeric material 132 into first channel 120 contributes to reduction of harmonics and vibrations on a workpiece, improves safety in handling the drum and housing of the apparatus, and reduces forces that may act on a brake rotor, rotating shaft, and other components of a lathe during operation of a lathe for machining, refinishing, balancing, or resurfacing a brake rotor.

The present invention also includes a centering device 68, as best shown in FIG. 2. Centering device 68, in the preferred embodiment of the present invention, is positionable on shaft 16'. Centering device 68 is shaped substantially like a truncated cone as shown best in FIG. 2. Accordingly, centering device 68 is formed with a top plane 70, a bottom plane 72, a cone surface 74, and a collar 76. Collar 76 extends radially from the base 78 of the cone surface 74 to bottom plane 72 of centering device 68. Collar 76, in the preferred embodiment of the present invention, is substantially coincident with the longitudinal axis through the center of top plane 70 and bottom plane 72 as shown in FIG. 2. Bottom plane 72 is formed with a slot 80. In a preferred embodiment of the present invention, slot 80 is substantially circumferential, as perhaps best shown in FIG. 2, and extends into bottom plane 72 of centering device 68 a depth of approximately 0.480 inch, plus or minus 0.010 inch. Slot 80 includes a first slot surface 82 and a second slot surface 84, as shown in FIG. 3. First slot surface 82 is located a distance $d^2$ from collar 76, as shown in FIG. 3, and second slot surface 84 is located a distance $d^3$ from collar 76, as also shown in FIG. 3. In a preferred embodiment of the present invention, distance $d^2$ is approximately 0.371 inch, plus or minus 0.010 inch, and distance $d^3$ is approximately 0.571 inch, plus or minus 0.010 inch.

Also included in the present invention is a spring 32' as best shown in FIG. 2. Spring 32' is provided with a distal end 86 and a proximal end 88. Proximal end 88 of spring 32' is inserted in chamber 18' of hub 44. Distal end 86 of spring 32' is placed in centering device 68 by placing distal end 86 of spring 32' in slot 80 on bottom plane 72 of centering device 68. In a preferred embodiment of the present invention, spring 32' is a helical spring rated for approximately eleven pounds per inch, having a maximum load in the range of 25 to 35 pounds, preferably 29 pounds. Also in the preferred embodiment of the present invention, the wire diameter of spring 32' is approximately 0.148 inch.

The present invention also includes a housing 90. Housing 90 is formed with a cavity 92. Cavity 92 is shaped approximately the same as cone surface 74 of centering device 68. As shown by cross-reference between FIGS. 2 and 3, cavity 92 has an inner anterior face 94, an inner side 96, an exterior wall 98, and an outer posterior plate 100, as best shown by cross-reference between FIGS. 2 and 3. Inner side 96 of cavity 92 is formed in the shape of a cone substantially identical dimensionally to cone surface 74 of centering device 68. A duct 102 is formed in housing 90. Duct 102 is substantially coincident with the longitudinal axis of the rotatable driven shaft 16' between inner anterior face 94 and outer posterior plate 100, and is dimensionally shaped to allow housing 90 to be slidably engageable with shaft 16'. Housing 90 also is formed with an exterior wall 98, as shown by cross-reference between FIGS. 2 and 6. As perhaps best shown in FIGS. 6A and 6B, a second channel 134 is formed through exterior wall 98 into housing 90. In a preferred embodiment of the present invention, second channel 134 is formed with a second trough 136, and opposing walls 138a,b extending substantially perpendicular from second channel 134, and having an upper edge 140a,b and a lower edge 142a,b, as shown best in FIG. 6A. In a preferred embodiment of the present invention, second trough 136 is located substantially coincident along a center line of housing 90 substantially midway between rim outer posterior plate 100 and trailing plate 144 of housing 90. Second channel 134 thus forms a channel girding housing 90 substantially around the center of housing 90. In accordance with the present invention, an elastomeric material 132 is inserted into second channel 134, as shown in FIGS. 6A and 6B. In a preferred embodiment of the present invention, elastomeric material 132 is rubber. The depth to which elastomeric material 132 is inserted into second channel 134 is not a material limitation of the present invention. In a preferred embodiment, however, it has been found that the depth of elastomeric material 132, as shown diagrammatically by $D^2$ in FIG. 6A, is approximately ¾ of the distance between upper edge 140a,b and a lower edge 142a,b of second channel 134. In operation, the insertion of elastomeric material 132 into second channel 134 contributes to reduction of harmonics and vibrations on a workpiece, improves safety in handling the drum and housing of the apparatus, and reduces forces that may act on a brake rotor, rotating shaft, and other components of a lathe during operation of a lathe for machining, refinishing, balancing, or resurfacing a brake rotor.

In operation, retaining ring 58 is inserted into groove 22' of hub 44. Hub 44 is engaged with shaft 16' sliding hub 44 on shaft 16' through hole 20'. Proximal end 88 of spring 32' is place in chamber 18' of hub 44. Centering device 68 is mounted on shaft 16' by inserting shaft 16' through passage 28' of centering device 68. Bottom plane 72 of centering device 68 is moved toward distal end 86 of spring 32', and distal end 32' is inserted into slot 80 on bottom plane 72 of centering device 68, as best shown in FIG. 3. A workpiece 104, in the preferred embodiment a brake rotor 106, is placed on shaft 16'. A brake rotor 106 may have various configurations and shapes, including generally the shape of a disk as shown best in FIG. 1. Rotor 106 may also have a protrusion in the approximate center of rotor 106 that is a substantially hemispherical cup 108, as perhaps best shown in FIG. 3. As also shown in FIG. 3, rotor 106 has an opening 110 through substantially hemispherical cup 108. Cone surface 74 of centering device 68, and an edge 111 of opening 110, may be brought in contact as adapter system 42 is assembled on shaft 16'. The shape, weight, and materials used in manufacturing rotor 106 may cause one or more forces described in this document to affect braking surface 112, and to cause components of a lathe to vibrate and alter positions in relationship to rotor 106 during machining of rotor 106. When assembled on shaft 16', hub 44, centering device 68, spring 32, retaining ring 58, and housing 90 are secured on shaft 16' by locking nut 114 by engaging locking nut 114 onto shaft 16' with threads 116 on shaft 16' against second raised extension 118, as best shown in FIG. 1. The present invention reduces or eliminates the effect of such forces on the invention and on rotor 106 during the machining process. In addition, the shape and configuration of rotor 106 does not affect use or operation of the present invention due in part to the ability of retaining ring 58, spring 32', and centering device 68, to act cooperatively to center rotor 106 and retain rotor 106 in a fixed position on shaft 16'. Spring 32' applies helical and torsional pressures to further stabilize the present invention during operation. The combination of elements in the present invention contribute to holding brake rotor 110 substantially perpendicular to shaft 16', concentrically during operation, and rotationally during operation of the present invention. It therefore is unnecessary to have a variety of components to change as the shape and configuration of brake rotor 106 changes.

While the apparatus for securing a workpiece to a rotatable machine member shown in the drawing figures is one embodiment of the present invention, it is merely one embodiment of the invention, is not intended to be exclusive, and is not a limitation of the present invention. Further, while the particular apparatus for securing a workpiece to a rotatable machine member as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims:

What is claimed is:

1. A housing and hub for an apparatus for demountably securing a workpiece to a machine member, comprising:
   a drum formed with a first banded channel, the drum slidably engageable on the machine member;
   a ring attachable to the drum;
   a body rotatably positionable on the machine member for selectively positioning the workpiece on the machine member;
   a spring insertable into the body; and
   a housing formed with a second banded channel, the housing being freely connectable to the shaft for locating the workpiece substantially perpendicular to the machine member.

2. A housing and hub for an apparatus for securing a workpiece on a machine member as recited in claim 1, wherein the machine member is a rotatable driven shaft.

3. A housing and hub for an apparatus for securing a workpiece on a machine member as recited in claim 1, wherein the drum is formed with a chamber, the chamber further having a hole formed substantially coincident with the longitudinal axis of the drum.

4. A housing and hub for an apparatus for securing a workpiece on a machine member as recited in claim 3, wherein the hole in the drum is dimensioned to be slidably engageable with the machine member.

5. A housing and hub for an apparatus for securing a workpiece on a machine member as recited in claim 4, further comprising a groove formed in the chamber.

6. A housing and hub for an apparatus for securing a workpiece on a machine member as recited in claim 5, wherein the ring is insertable into the groove formed in the chamber.

7. A housing and hub for an apparatus for securing a workpiece on a machine member as recited in claim 1, wherein the body is formed substantially as a truncated cone.

8. A housing and hub for an apparatus for securing a workpiece on a machine member as recited in claim 7, wherein the body further comprises a passage through the body substantially coincident with a longitudinal axis through the body, the passage forming substantially a slip fit with the machine member.

9. A housing and hub for an apparatus for securing a workpiece on a machine member as recited in claim 1, wherein the selectively positioning means is a body.

10. A housing and hub for an apparatus for securing a workpiece on a machine member as recited in claim 1, wherein the housing is formed with a cavity for receiving a portion of the body.

11. A housing and hub for an apparatus for securing a workpiece on a machine member as recited in claim 10, wherein the cavity is formed as a cone substantially identical dimensionally to the body, and wherein the cavity further includes a duct through the housing.

12. A housing and hub for an apparatus for securing a workpiece on a machine member as recited in claim 1, further comprising means for demountably locking the drum, the ring, the body, the spring, and the housing on the machine member.

13. A housing and hub for an adapter system for securing a rotor to a lathe, comprising:
   a hub formed with an exterior face, the hub being slidably engageable with a rotatable driven shaft of the lathe, wherein the exterior face further comprises a first channel girding the hub,
   and further wherein the first channel includes a layer of elastomeric material;
   a centering device positionable on the shaft;
   a spring having a distal end and a proximal end, the distal end insertable in the hub, the proximal end connectable to the centering device; and
   a housing formed with an exterior wall, the housing being freely movable axially on the shaft for locating the rotor substantially perpendicularly to the shaft,
   wherein the exterior wall further comprises a second channel girding the housing,
   and further wherein the second channel includes a layer of elastomeric material.

14. A housing and hub for an adapter system for securing a rotor to a lathe as recited in claim 13, wherein the hub is formed with a chamber having an interior face, exterior face, a rim, an inner surface, and a hole between the interior face and the exterior face formed substantially coincident with the longitudinal axis of the hub.

15. A housing and hub for an adapter system for securing a rotor to a lathe as recited in claim 13, wherein the hole in the hub is slidably engageable with the shaft.

16. A housing and hub for an adapter system for securing a rotor to a lathe as recited in claim 13, wherein the hub further comprises a substantially circumferential groove formed in the inner surface of the chamber.

17. A housing and hub for an adapter system for securing a rotor to a lathe as recited in claim 13, wherein the retaining ring is insertable into the groove formed in the inner surface of the chamber.

18. A housing and hub for an adapter system for securing a rotor to a lathe as recited in claim 13, wherein the centering device is substantially a truncated cone formed with a top plane, a bottom plane, a cone surface, and a collar tapering from the base of the truncated cone to the bottom plane substantially coincident with the longitudinal axis through the center of the top plane and the bottom plane, and further comprising a slot formed in the bottom plane.

19. A housing and hub for an adapter system for securing a rotor to a lathe as recited in claim 13, wherein the centering device further comprises a passage through the top plane and the bottom plane substantially coincident with the longitudinal axis of the centering device, the passage further having a substantially slip fit with the shaft.

20. A housing and hub for an adapter system for securing a rotor to a lathe as recited in claim 13, wherein the housing is formed with a cavity for receiving a portion of the cone surface of the centering device, the cavity having an inner anterior face, an inner side, an exterior wall, and an outer posterior plate.

21. A housing and hub for an adapter system for securing a rotor to a lathe as recited in claim 13, wherein the inner side of the cavity is formed to receive a portion of the cone surface of the centering device, and wherein the cavity is formed with a duct between the inner anterior face and the outer posterior plate substantially coincident with the longitudinal axis of the shaft.

22. A housing and hub for an adapter system for securing a rotor to a lathe as recited in claim 13, further comprising a locking nut for demountably locking the hub, the centering device, the spring, the retaining ring, and the housing on the shaft.

23. A method for securing a rotor to a lathe, comprising the steps of:
   providing a hub formed with a first banded channel, said hub being slidably engageable with a rotatable shaft of the lathe;

installing a centering device axially positionable on the shaft;

including a spring demountably insertable in the hub and connectable to the centering device;

furnishing the system with a housing formed with a second banded channel, said hub being freely locatable on the shaft for securing the rotor in the system in a substantially vertical position; and equipping the lathe with a locking nut.

24. A method for securing a rotor to a lathe as recited in claim 23, wherein the centering device installing step includes the substeps of:

a. forming the centering device with a top plane, a bottom plane, a conical surface, and a collar tapering from the base of the truncated cone to the bottom plane substantially coincident with the longitudinal axis through the center of the top plane and the bottom plane; and b. forming a passage through the top plane and the bottom plane substantially coincident with the longitudinal axis through the centering device, the passage forming a substantially interference fit with the shaft.

25. A method for securing a rotor to a lathe as recited in claim 23, wherein the spring including step includes the substep of selecting a spring having a distal end and a proximal end, the distal end demountably insertable in the hub, the proximal end connectable to the centering device.

* * * * *